United States Patent
Baretzki

(10) Patent No.: US 7,707,281 B2
(45) Date of Patent: Apr. 27, 2010

(54) REDUNDANT INPUT/OUTPUT MANAGEMENT DEVICE, NOTABLY FOR DATA ROUTING

(75) Inventor: Laurent Baretzki, Issy les Moulineaux (FR)

(73) Assignee: Airsys ATM S.A., Bagneux (FR)

( * ) Notice: Subject to any disclaimer, the term of this patent is extended or adjusted under 35 U.S.C. 154(b) by 2705 days.

(21) Appl. No.: 09/842,801

(22) Filed: Apr. 27, 2001

(65) Prior Publication Data

US 2002/0010750 A1    Jan. 24, 2002

(30) Foreign Application Priority Data

Apr. 28, 2000    (FR) .................................. 00 05517

(51) Int. Cl.
*G06F 15/173*    (2006.01)
*G06F 11/00*    (2006.01)

(52) U.S. Cl. .......................... 709/224; 714/43

(58) Field of Classification Search .............. 709/219, 709/249, 222, 238, 224, 208; 714/4, 11, 714/13, 740, 43; 370/253, 216, 217, 219, 370/352; 701/33

See application file for complete search history.

(56) References Cited

U.S. PATENT DOCUMENTS

| | | | | |
|---|---|---|---|---|
| 5,016,244 A | * | 5/1991 | Massey et al. ............... 370/217 |
| 5,198,999 A | * | 3/1993 | Abe et al. ............... 365/189.05 |
| 5,379,386 A | * | 1/1995 | Swarts et al. ................. 710/310 |
| 5,473,599 A | * | 12/1995 | Li et al. ......................... 370/219 |
| 5,475,846 A | * | 12/1995 | Moore ........................... 710/260 |
| 5,490,252 A | * | 2/1996 | Macera et al. ............... 709/249 |
| 5,506,790 A | * | 4/1996 | Nguyen ........................ 700/286 |
| 5,566,388 A | * | 10/1996 | Brame et al. ................. 370/340 |
| 5,649,091 A | | 7/1997 | Ould-Ali et al. .............. 714/11 |
| 5,675,723 A | | 10/1997 | Ekrot et al. |
| 5,727,142 A | * | 3/1998 | Chen ............................... 714/2 |
| 5,737,404 A | * | 4/1998 | Segal ........................... 379/230 |
| 5,737,423 A | * | 4/1998 | Manduley ...................... 705/67 |
| 5,802,258 A | * | 9/1998 | Chen ............................ 714/10 |
| 5,812,748 A | | 9/1998 | Ohran et al. ................... 714/11 |
| 5,838,904 A | * | 11/1998 | Rostoker et al. ............ 709/250 |
| 5,852,724 A | * | 12/1998 | Glenn et al. ................. 709/239 |
| 5,957,985 A | * | 9/1999 | Wong et al. .................... 701/33 |
| 5,982,745 A | | 11/1999 | Wolff et al. .................. 370/219 |

(Continued)

FOREIGN PATENT DOCUMENTS

EP    0 416 943    3/1991

*Primary Examiner*—Douglas B Blair
(74) *Attorney, Agent, or Firm*—Oblon, Spivak, McClelland, Maier & Neustadt, L.L.P.

(57) ABSTRACT

The disclosure relates to a device with built-in redundancy for input/output management, notably a data routing system. The device includes first management means and second management means connected to each other via two interfaces, one a network and the other a standby line, said means mutually exchanging polling messages via these two interfaces, said first means being considered to be defective by said second means when they no longer sends messages during a given time interval on at least one of said two interfaces, characterized in that it includes at least one algorithm to reset said first and second means, the defective means being deactivated and the other means activated during the reset after detection of a failure. The device is applicable to the handling of air traffic data and, more generally, to all digital data input/output management systems necessitating a high level of operational reliability without an excessive cost premium.

24 Claims, 1 Drawing Sheet

U.S. PATENT DOCUMENTS

| | | | | |
|---|---|---|---|---|
| 6,105,146 A * | 8/2000 | Tavallaei et al. | | 714/2 |
| 6,108,300 A * | 8/2000 | Coile et al. | | 370/217 |
| 6,148,410 A * | 11/2000 | Baskey et al. | | 714/4 |
| 6,173,411 B1 * | 1/2001 | Hirst et al. | | 714/4 |
| 6,182,139 B1 * | 1/2001 | Brendel | | 709/226 |
| 6,195,351 B1 * | 2/2001 | Hiscock et al. | | 370/389 |
| 6,209,039 B1 * | 3/2001 | Albright et al. | | 709/249 |
| 6,216,173 B1 * | 4/2001 | Jones et al. | | 715/705 |
| 6,240,087 B1 * | 5/2001 | Cummings et al. | | 370/360 |
| 6,253,334 B1 * | 6/2001 | Amdahl et al. | | 714/4 |
| 6,266,785 B1 * | 7/2001 | McDowell | | 714/11 |
| 6,330,221 B1 * | 12/2001 | Gomez | | 370/217 |
| 6,345,215 B1 * | 2/2002 | Drechsler | | 700/306 |
| 6,345,294 B1 * | 2/2002 | O'Toole et al. | | 709/222 |
| 6,351,183 B1 * | 2/2002 | Khabbaz et al. | | 330/51 |
| 6,359,858 B1 * | 3/2002 | Smith et al. | | 370/217 |
| 6,373,838 B1 * | 4/2002 | Law et al. | | 370/352 |
| 6,397,260 B1 * | 5/2002 | Wils et al. | | 709/238 |
| 6,460,146 B1 * | 10/2002 | Moberg et al. | | 714/10 |
| 6,467,049 B1 * | 10/2002 | Robins et al. | | 714/13 |
| 6,477,140 B1 * | 11/2002 | Uda et al. | | 370/216 |
| 6,480,473 B1 * | 11/2002 | Chambers et al. | | 370/253 |
| 6,490,246 B2 * | 12/2002 | Fukushima et al. | | 370/220 |
| 6,539,494 B1 * | 3/2003 | Abramson et al. | | 714/4 |
| 6,556,547 B1 * | 4/2003 | Srikanth et al. | | 370/317 |
| 6,628,649 B1 * | 9/2003 | Raj et al. | | 370/360 |
| 6,636,989 B1 * | 10/2003 | Kondo et al. | | 714/23 |
| 6,650,646 B1 * | 11/2003 | Galway et al. | | 370/397 |
| 6,650,749 B1 * | 11/2003 | Laulo | | 379/279 |
| 6,658,595 B1 * | 12/2003 | Thamattoor | | 714/11 |
| 6,674,756 B1 * | 1/2004 | Rao et al. | | 370/395.21 |
| 6,694,201 B1 * | 2/2004 | Lee et al. | | 700/96 |
| 6,697,849 B1 * | 2/2004 | Carlson | | 709/219 |
| 6,701,375 B1 * | 3/2004 | Walker et al. | | 709/243 |
| 6,738,826 B1 * | 5/2004 | Moberg et al. | | 709/242 |
| 6,738,940 B1 * | 5/2004 | Hummel et al. | | 714/740 |
| 6,747,978 B1 * | 6/2004 | Lewallen et al. | | 370/401 |
| 6,751,191 B1 * | 6/2004 | Kanekar et al. | | 370/217 |
| 6,766,378 B2 * | 7/2004 | Baretzki | | 709/238 |
| 6,885,635 B1 * | 4/2005 | Haq et al. | | 370/219 |
| 6,910,148 B1 * | 6/2005 | Ho et al. | | 714/4 |
| 6,975,587 B1 * | 12/2005 | Adamski et al. | | 370/217 |
| 6,978,309 B1 * | 12/2005 | Dorbolo | | 709/231 |
| 6,987,727 B2 * | 1/2006 | Fredette et al. | | 370/225 |
| 7,050,443 B2 * | 5/2006 | Baretzki | | 370/400 |
| 7,155,536 B2 * | 12/2006 | Mongazon-Cazavet et al. | | 709/242 |
| 7,392,424 B2 * | 6/2008 | Ho et al. | | 714/4 |
| 2003/0237016 A1 * | 12/2003 | Johnson et al. | | 714/4 |

* cited by examiner

REDUNDANT INPUT/OUTPUT MANAGEMENT DEVICE, NOTABLY FOR DATA ROUTING

BACKGROUND OF THE INVENTION

The present invention concerns a device with built-in redundancy for management of inputs/outputs, notably a data routing system. It is notably applicable to the handling of air traffic data and, more generally, to all digital data input/output management systems necessitating a high level of operational reliability without an excessive cost premium.

DESCRIPTION OF THE PRIOR ART

Air traffic density has reached a very high level, while air safety requirements are becoming increasingly stringent. Modern-day air traffic management therefore involves the processing of large quantities of data, notably used by air traffic controllers and pilots. These data include a broad range of radar data, meteorological data, aircraft positions and flight plans, and instrument landing system (ILS) data.

The processing of all this information requires powerful computing means. Among these means, the interfaces with data centers and decision-makers are of particular importance. These interfacing means serve notably for information routing to ensure that data finds its way to the right destinations. Given the very large volumes of data, the performance of these means is of vital importance in the global operation of an air traffic management system.

Commercially-available equipment exists with operating systems that can satisfy these routing needs. For example, there is a range of products carrying the registered brand name "LINES", meaning "Link Interface Node for External Systems". These modular products are designed to enable routing and processing of input/output messages carried on incoming/outgoing serial links and Ethernet networks. Standard serial links, using protocols such as X25, HDLC and BSC for example, can be handled, as can dedicated lines, such as special radar data transmissions protocols.

These so-called routers can operate with a software architecture of frontal processor type. They are equipped with FPBSS-type software, meaning "Front Processor Basic System Software". In this operating mode, the router is connected to a single application program. It has only one upstream function, for example routing data to the required destination. The essential application software is stored in one or more central computers; one router is required for each application.

The performance of these routers can enhanced by using an open communication mode known as OCP (Open Communication Processor). In this mode, a router is connected to several applications and operates substantially as a data server. It is notably used to process and route the data from any input point to any output point. This operating mode is particularly suitable for air traffic management. In an air traffic management application, this mode notably provides the following functionalities:

- black-box-type distribution of radar data to the centers, the radar data being received via serial interfaces and transmitted via an Ethernet network to an identified group of machines; such distribution is known as "UDP multicast";
- autonomous conversion of messages or protocols, notably enabling conversion of message formats or specific protocols, for example ISR2 into ASTERIX, X25 into HDLC-UI, etc.;
- retransmission of radar data via serial lines to processing circuits.

In an air traffic management application, the operational reliability of the computer systems, and therefore of the routing systems is of prime importance, since the safety of passengers is at stake. For example, current safety standards impose that the air coverage of an air traffic control center must not be interrupted more than a few seconds per year. To achieve such reliability, redundancy techniques must be applied, notably by duplicating equipment so that the functions of a machine that develops a fault can immediately be taken over by another. As a general rule, each router is duplicated. One problem to be handled is the hand-over of one router to another when the first become defective. One known solution consists in providing an active router, called the master, and an inactive router, called the slave, with a third-party system that arbitrates the transfer of execution from the master to the slave. This solution is not economic mainly due to the need for a third-party system in addition to the redundant router.

To make the system economic it is possible to eliminate the arbitrator, in which case a message interchange protocol must be defined between the master and the slave. In particular, when the master becomes defective, the slave no longer receives messages so it then takes over the processing. However, degraded operation can occur, notably where the master degrades the processed data without realizing it. The master, unaware that it is operating defectively, does not deactivate its inputs and outputs. The slave, on the other hand, knows that the master is defective, but is unable to take control of the routing correctly, mainly due to the fact that the master has not deactivated its input/output ports. The system continues to operate in degraded mode, with obvious negative impact on the operational reliability.

SUMMARY OF THE INVENTION

One object of the invention is to reduce the costs associated with operational reliability, by eliminating the use of a third-party arbitration system, yet without degrading operation reliability, whatever types of input/output ports are used.

For this purpose, the invention is a device for digital input and output data management, including first management means and second management means connected to each other via two interfaces, one a network and the other a standby line, said means mutually exchanging polling messages via these two interfaces, said first means being considered to be defective by said second means when they no longer sends messages during a given time interval on at least one of said two interfaces, characterized in that it includes at least one algorithm to reset said first and second means, the defective means being deactivated and the other means activated during the reset after detection of a failure.

The input and output management means can be routers or data servers.

At start-up, the first means have for example the role of master and the seconds means the role of slave; the master manages the input and output data. To assure redundancy, the means have the same functions and include the same software and configuration files.

When one of the means are detected as being defective by the other means, the latter deactivate the defective means, for example. The slave can then take charge of the management of the data in place of the master.

Advantageously, the polling messages, the frequency of interchange of these messages, and the time limit between two successive messages are defined by parameters in a configuration file contained in each of the means, several sets of parameters being stored depending on the application. The parameters specific to an application can be loaded into RAM memory on initialization of the device.

The main advantages of the invention are that it is adaptable to numerous applications and is easy to implement.

BRIEF DESCRIPTION OF THE DRAWINGS

Other characteristics and advantages of the invention will become clear on reading the following description of a preferred embodiment, taken only as a non-limitative example, making reference to the attached drawings of which.

DETAILED DESCRIPTION OF A PREFERRED EMBODIMENT

Figure 1:
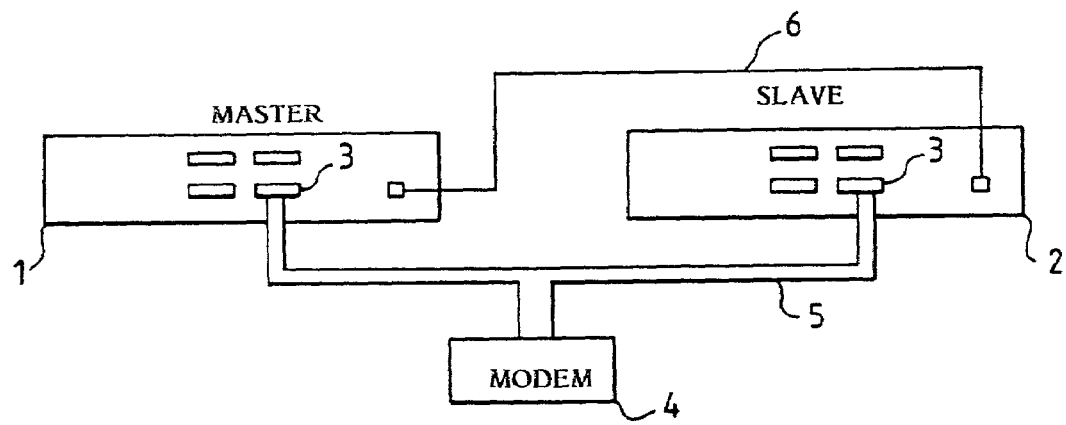
FIG. 1 shows an example of redundant routing system in the case where the input and output ports are of serial type.

FIG. 1 presents an embodiment of a redundant routing system in the case where the input/output ports are of serial type. The system includes a router 1 acting as a master router and a router 2 acting as a slave. These two routers have the same functions and notably include the same software and configuration files. A given port 3 of each router communicates via a serial link with the same system 4, for example a modem. For this purpose, the link between the system 4 and the two routers is via a "Y-split cable" 5. A standby bus 6 connects the two routers 1, 2.

When the two routers 1, 2 start up together, the master 1 activates its electric modes on its input/output ports 3 whereas the slave 2 leaves its ports 3 inactive, in the high impedance state. This means that even if both the routers are configured and operative, only the master 1 communicates with the modem 4. In the event of failure of the master, there are two main cases to consider:
  the master resets by placing its ports 3 in the high impedance state and itself becomes the slave; at the same time, the slave 2 becomes the master and its ports are electrically activated. This is the normal situation and is easily managed;
  the master develops a fault but does not reset. The slave knows that it should become master, but the current master does not deactivate its ports, so there is no fail-over of one router to the other owing to a potential conflict between the ports 3 of the two routers. This is the most complex situation to be handled.

This second situation must however be handled since it dangerously prejudices the operational reliability. In this operating mode, the master could process our route data incorrectly. To deal with this problem, a standby bus 6 is connected between the two routers, which enables a reset command to be sent, in other words a command sent by the slave to suspend the master's ports 3, after which the slave takes control.

The type of redundancy architecture illustrated in FIG. 1 is quite suitable when the input/output ports involved are serial ports. However, it is inadequate when the routers use a local area network (LAN), for example of the Ethernet type.

Figure 2:
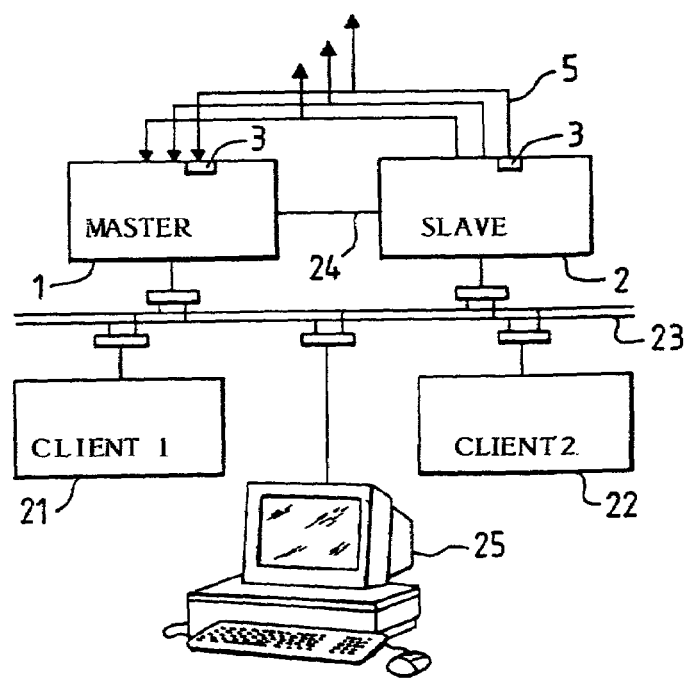
FIG. 2 shows an example of redundant routing including an Ethernet-type communication network with client workstations.

FIG. 2 illustrates an embodiment of a device according to the invention. It is a data routing system including two routers 1, 2, one the master, the other the slave. These two routers operate in open mode (OCP). The device having built-in redundancy, the two routers have the same functions and notably the same software and configuration files. Similarly, the inputs and outputs to other systems also have built-in redundancy.

The two routers are for example connected via a network 23, for example Ethernet or Internet, to one or more remote client systems 21, 22. They are moreover connected to other systems, such as modems, via serial links. A Y-split cable 5 connects a given port 3 of each router to the same system, notably to enable these two ports 3 to interchange with this system. When the master is active, its serial port is active whereas that of the slave is inactive, being for example in the high impedance state.

The two routers are connected via the network 23, for example Ethernet or Internet, and via a standby line 24, for example a bus. By way of example we consider an Ethernet network 23. At start-up or on initialization of the device, one router 1 is the master and the other 2 is the slave. The master then manages the input and output data, and therefore routes them. During operation, the two routers 1, 2 mutually interchange messages known as polling messages. These polling messages are for example exchanged cyclically, in other words at regular time intervals. They are interchanged via the Ethernet network 23, for example using a UDP unicast-type distribution. Polling messages are also interchanged via the standby line 24. A device according to the invention therefore includes at least two polling message interchange interfaces, an interface network (for example Ethernet), and a communication bus 24. A polling message is sent by the slave to the master to check that the master is operative and not defective; the master must reply to this message. All types of polling messages can be used. The most simple is for example to send the master a given message and check that it sends its back in its integrality. Similarly, the master sends polling messages to the slave to check that it is operative. In this manner both the units 1, 2 can be supervised without the intervention of third-party equipment.

When the slave 2 does not receive at least one polling message in a given time interval on at least one of the two interfaces (the Ethernet 23 or the standby line 24), its program assumes that the master is defective. The slave then decides to become master. For this purpose, it activates a "fail-over" mechanism, which can have several components. It includes an algorithm, installed for example both in the master and the slave, which forces the master to reset, and more specifically to re-initialize. This algorithm is programmed moreover such that during this re-initialization, the slave takes control and therefore becomes active in the processing of the data, whereas the master remains inactive. This algorithm moreover provides for the suspension of the input/output ports of the master and the activation of the input/output ports of the slave that becomes master. A supervision station 25 enables for example reading of fault and failure reports sent by the master or the slave. This station 25 can moreover be used for other functions in the general framework of the application. The device includes for example means of alert to warn of a fault, to ensure that the defective equipment is replaced promptly.

The algorithm which forces the reset of the master, and finally its suspension, is installed in the master, but it is activated by the slave. For this purpose, the slave knows the memory address of this algorithm. More precisely the memory address of this algorithm is stored in the slave. Preferably, in a symmetrical manner, the algorithm is also installed in the slave, for reasons of standardization of execution of the equipment, but also so that the master can completely deactivate the slave in the event of failure of the slave. The master therefore has access to the address of the reset algorithm in the slave. The reset algorithm, its address, the polling messages, the transmission interval between these messages, the time limit between two messages before failover, and other configuration parameters are notably stored in a configuration file contained in each router. Several sets of parameters can be stored in this configuration file, one for each final application. On initialization of the routers, the application's specific parameters are for example loaded into a RAM memory. The management of the various software layers, including the reset algorithm, and the communications between these layers are classically treated by an operating system, possibly associated with intermediate software layers known as "middleware" installed in the routers.

The invention has been described with reference to a data routing device in which a standby router is provided for each router. It will be clear to professionals of the art that the invention is also applicable to other means of input/output management, for example data servers. It is advantageously applicable to all types of applications requiring a high level of operational reliability yet without excessive cost. Moreover, it is simple to implement since it is essentially software-based.

What is claimed is:

1. A redundant routing system including a processor, the system comprising:
   a first routing unit configured to manage input data and output data;
   a second routing unit configured to manage said input data and said output data;
   a network interface configured to connect said first and second routing units; and
   a standby bus interface configured to connect said first and second routing units to each other, wherein,
   when said first routing unit is managing said input data and said output data, said second routing unit detects a failure of said first routing unit by monitoring both the network and the standby bus interfaces using messages sent over both the network and the standby bus interfaces,
   when said second routing unit detects said failure of said first routing unit, said second routing unit activates a reset algorithm stored in said first routing unit so that said first routing unit no longer manages said input data and said output data and said second routing unit starts managing said input data and said output data, and
   a memory address of the reset algorithm stored in said first routing unit is stored in a set of parameters stored in at least one configuration file included in said second routing unit.

2. The system of claim 1, wherein said first and second routing units have identical functions and include identical software and configuration files.

3. The system of claim 2, wherein, after said second routing unit is activated and starts managing said input data and said output data, said first routing unit detects a failure of said second routing unit.

4. The system of claim 1, further comprising:
   at least one serial link connecting said first and second routing units to at least one other system.

5. The system of claim 4, wherein said at least one serial link comprises at least one Y-split cable.

6. The system of claim 1, wherein said first routing unit is configured to deactivate itself and to activate said second routing unit by a change in an impedance of at least one input/output serial port.

7. The system of claim 6, wherein the change in impedance imparts putting said at least one input/output serial port in a high impedance state.

8. The system of claim 1, wherein said second routing unit is configured to deactivate said first routing unit by sending a reset command to said first routing unit via the standby bus interface, said reset command executing the reset algorithm on said first routing unit.

9. The system of claim 1, wherein the messages are polling messages that are exchanged via the network and the standby bus interfaces, said polling messages carrying information relevant to detecting said failure.

10. The system of claim 9, wherein said second routing unit is configured to detect said failure of said first routing unit when said polling messages are not properly responded to on at least one of the network and the standby bus interfaces.

11. The system of claim 1, wherein, when launching an application on said first and second routing units, the set of parameters, which includes configuration parameters of said application, is loaded into a random access memory (RAM).

12. The system of claim 1, wherein said network interface is configured to link said first and second routing units with at least one remote client system.

13. The system of claim 1, wherein said network interface is the Internet.

14. The system of claim 1, wherein said network interface is an Ethernet network.

15. The system of claim 1, wherein said network interface is a digital local area network (LAN).

16. The system of claim 1, wherein said first and second routing units are configured to operate in Open Communication Processor (OCP) mode.

17. The system of claim 1, further comprising:
   an alert protocol to warn of said failure of the system.

18. The system of claim 1, wherein said first and second routing units are data routers.

19. The system of claim 1, wherein said first and second routing units are data servers.

20. The redundant routing system of claim 1, wherein the at least one configuration file includes:
   the messages themselves;
   at least one transmission interval between the messages; and
   at least one time limit between two of the messages.

21. A redundant routing system, the system comprising:
   first routing means for managing input data and output data;
   second routing means for managing said input data and said output data;
   networking means for connecting said first and second routing means; and
   connecting means for connecting said first and second routing means to each other, wherein,
   when said first routing means manages said input data and said output data, said second routing means detects a failure of said first routing means using both said networking and the connecting means by using messages sent over both said networking and connecting means,
   when said second routing means detects said failure of said first routing means, said second routing means activates a means for resetting said first routing means stored in said first routing means so that said first routing means no longer manages said input data and said output data and said second routing means starts managing said input data and said output data, and said second routing means includes configuration means, storing a set of parameters including a memory address of the means for resetting stored in said routing means.

22. The system of claim 21, further comprising:

linking means for connecting said first and second routing means to at least one other system.

23. The system of claim 21, further comprising:

polling means for exchanging the messages, which are polling messages, via said networking and connecting means, said polling messages carrying information relevant to detecting said failure.

24. The redundant routing system of claim 21, wherein the configuration means includes:

the messages themselves;

at least one transmission interval between the messages; and at least one time limit between two of the messages.

* * * * *